United States Patent [19]

Dawson et al.

[11] Patent Number: 5,005,311
[45] Date of Patent: Apr. 9, 1991

[54] SELF-COLORING FISHING LURES

[76] Inventors: Jack W. Dawson, 625 Wendy Way, Paradise, Calif. 95969; Norbert M. Perrault, P.O. Box 176, Tehama, Calif. 96090

[21] Appl. No.: 471,974

[22] Filed: Jan. 29, 1990

[51] Int. Cl.$^5$ ............................................. A01K 85/00
[52] U.S. Cl. ..................................... 43/42.32; 43/42; 43/42.34
[58] Field of Search ................ 43/42.32, 42.33, 42.34, 43/42.37, 42.24, 42.48, 43.13, 42.45, 42.06

[56] References Cited

U.S. PATENT DOCUMENTS

| | | | |
|---|---|---|---|
| 1,612,264 | 12/1926 | Cressey | 43/42.33 |
| 2,694,877 | 11/1954 | Wise | 43/42.33 |
| 3,032,911 | 5/1962 | Wilhelmi | 43/42.37 |
| 3,690,028 | 9/1972 | Walker, Jr. . | |
| 3,940,869 | 3/1976 | Robert | 43/42.24 |
| 3,982,349 | 9/1976 | Hills | 43/42.48 |
| 4,074,455 | 2/1978 | Williams, Jr. . | |
| 4,649,662 | 3/1987 | Tharp | 43/43.14 |
| 4,773,181 | 9/1988 | Radden . | |
| 4,790,100 | 12/1988 | Green, Sr. . | |
| 4,856,223 | 8/1989 | Evans | 43/42.06 |

Primary Examiner—Kurt Rowan
Assistant Examiner—Chuck Y. Mah

[57] ABSTRACT

The invention provides fishing lures manufactured of a soft resilient material which becomes translucent when wet disclosing a discernable inner core. With and without the inner core, the change from an apparent solid color to a shimmering translucent appearance makes the lures appear like outlines of fish eggs, crustaceans, and other game fish quarry. With a center core, the darker core areas appear like fish egg vitellus and crustacean inner organs. A dye added to the cover material of the lures produces a translucent image similar in color particular to salmon eggs and to small crayfish.

6 Claims, 3 Drawing Sheets

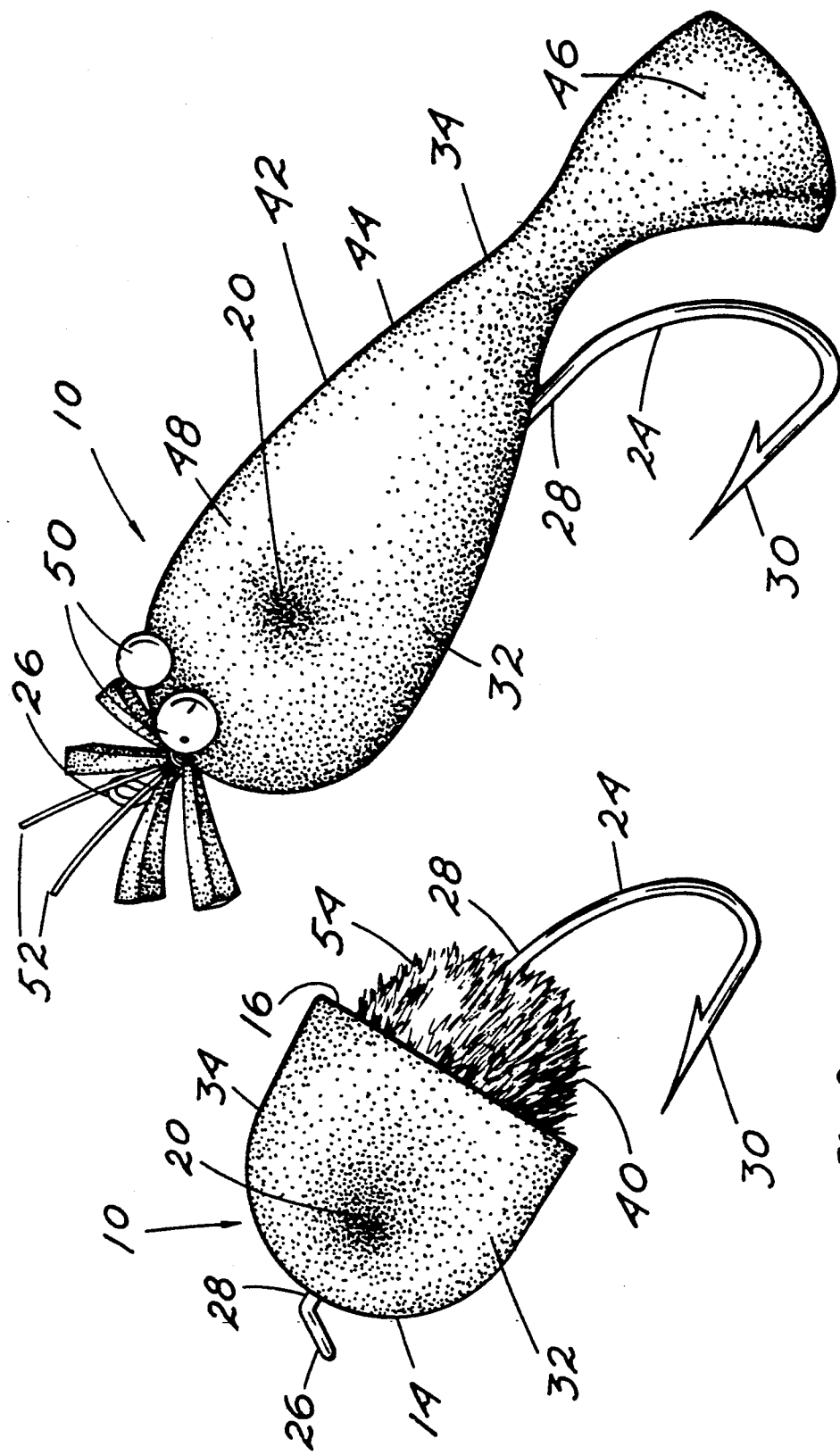

SELF-COLORING FISHING LURES

BACKGROUND OF THE INVENTION

1. Field of the Invention

The invention relates to fishing lures in general with the present invention particularly directed towards realistic looking and feeling fishing lures manufactured of soft resilient materials. The lures according to the invention include improvements in self-coloring and transparency which makes these particular lures appear natural and feel like real food to a striking fish.

2. Description of the Prior Art

To ascertain past art, a patent search was conducted in the classes and subclasses including 43/42.25, 42.26, 42.53, and 52.45. Patents examined included the U.S. Pat. Nos. as follows:

2,909,862; 3,579,895; 3,690,028; 4,074,455; 4,227,332; 4,773,181; 4,777,759; 4,790,100; and 4,831,764.

Those patents considered most pertinent to our invention include:

1. The flexible fishing lure disclosed by Green, Sr. U.S. Pat. No. 4,790,100. dated Dec. 13, 1988, in which a pliable hollow body fishing lure has trailing ends and side attachments which move realistically when pulled through the water. Although the Green, Sr. device has an insertable core member, it is not designed for color changing either by inserts or material of manufacture.

2. A hook and a hand tied ball of fluorescent yarn is shown in a lure patent granted on Sept. 12, 1972, Walker, Jr. U.S. Pat. No. 3,690,028. The Walker, Jr. lure is designed to glow and simulate real life fish food.

3. Simulated fish eggs are shown in the Radden U.S. Pat. No. 4,773,181 dated Sept. 27, 1988. His eggs are structured of yarn strands which expand into spherical shapes. Different colored yarn simulates egg nucleus to make them appear natural. No color changing materials are used.

4. A moldable soft plastic bodied lure is shown in Williams, Jr. U.S. Pat. No. 4,074,455, issued on Feb. 21, 1978. The lure uses water bubbles in closely spaced pockets on the surface to simulate a glistening scaly appearance. Tail inserts give the lure the appearance of being shinny and swimming when pulled through the water for attracting fish.

Although the search produced a variety of crank baits and other fishing lures, the foregoing appeared most pertinent to our invention. Some crank baits using dissolvable pellets for making color changes in a plastic body are shown in other patents and are available in the market place. However, lures like ours using a particular material combination to produce a particular change in the lure appearance were not seen.

SUMMARY OF THE INVENTION

Therefore, in practicing our invention we provide lures manufactured of a soft resilient material which becomes translucent when wet making the lures according to the invention appear and feel like the native quarry sought by feeding game fish. The attraction is further enhanced by a core section simulating the innards of a crayfish or the vitellus of a fish egg which becomes perceivable as the translucency of the wetted outer lure material increases. Although the outer lure materials become translucent almost to the point of transparency when wet, the crustaceous outline of a crawfish and the round outline of a fish egg remains discernible. This retained outline of the crustacean and fish egg with the visible core makes our particular lure a very natural and attractive bait.

To produce a natural translucent effect, our lures are fabricated from a soft pliable and resilient medium density expanded plastic such as polyurethane or polyether. These materials are expanded plastics having open cellular cavities between the pliable plastic material producing a spongy finish. From experimentation, we found that particular densities of these materials wrapped around a nucleus or core of fast colored materials became increasingly translucent as the spongy surfaces absorbed water. At or near saturation, the fast color. nucleus materials of the core become mistily discernible and with the profile of a crustacean, a nymph, or a fish egg being visible, the lure of the immediate invention develops a realistic appearance. The inner material used can be yarn, string, or feathers applied by tying or by being glued over a conventional fishhook. For lures simulating crustaceans, small fish, or flies, the yarn or feathers can extend out of the body section like appendages over and concealing the barbed hook end of the fishhook and wave life-like in the water. Fish eggs can be round with the hook passed through or half round with the egg vitellus in the form of colored yarn waving out the flat side along the shaft of the hook. A half round shape with a flat side has proved to be a good simulation of salmon or other fish eggs. For a more realistic effect, especially for salmon eggs, the open celled foam is lightly colored with a dye. Properly shaped and adorned with eyes and feelers in simulations requiring them, our lures are highly effective as fish attracting artificial baits.

In use, the lures according to this invention are attached conventionally to fishing lines, preferably by clear filament leaders, or to fly caster's fishing lines and used as natural bait.

Therefore, a principal object of the invention is to provide an artificial fishing lure having a fast color nucleus or core encased in a sponge-like covering in which the covering becomes translucent when wet exposing the core to create realistic manifestations of various game fish foods.

Another object of the invention is to provide a self-coloring artificial fishing lure in which the color change is produced in the structural materials without requiring the addition of coloring or color pellets.

A further object of our invention is to provide a fishing lure made of a soft moldable material which is readily shaped into a variety of fish attracting foods such as fish eggs, small crustaceans, nymphs, and other game fish quarry.

A still further object of the invention is to provide a fishing lure with color changing materials which can be lightly dyed and will assume the color of a particular fish food when emersed in water such as salmon eggs.

Other objects and the many advantages of our invention will become understood from reading descriptions of numbered parts in the specification and subsequent comparison of the described numbered parts with like numbered parts illustrated in the drawings.

BRIEF DESCRIPTION OF THE DRAWINGS

As shown in the drawings:

FIG. 3 is a side view of a fishing lure according to the invention structured self-coloring in a rounded body with a yarn core protruding simulating exposed fish egg vitellus or crustacean appendages for fish attraction and to conceal the fishhook spear.

FIG. 4 illustrates application of the self-coloring and translucent materials as taught in this invention in the form of a small crustacean with the body appearance further enhanced by the addition of simulated eyes and antenna.

DESCRIPTION OF PREFERRED EMBODIMENTS

Figure 1:
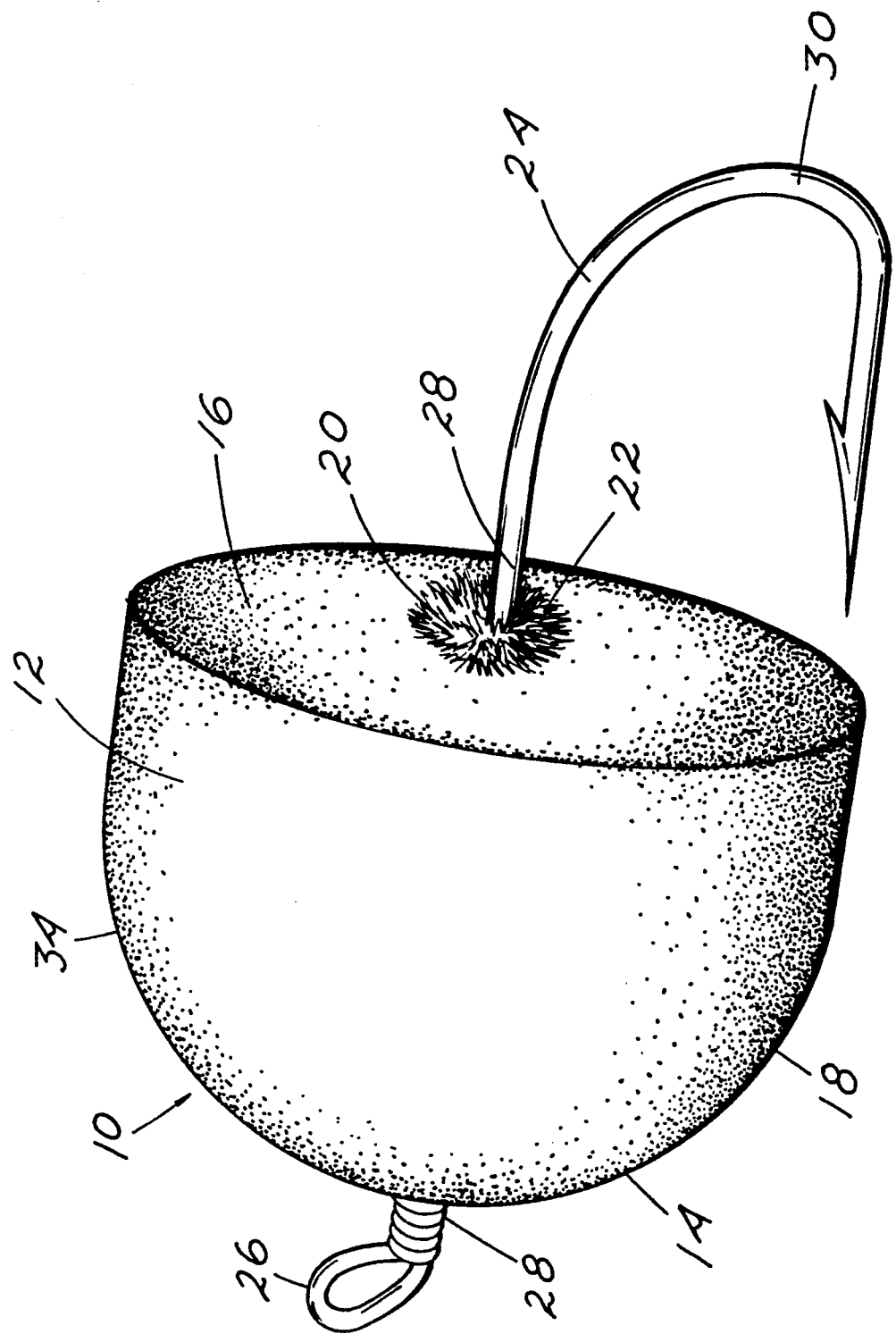
FIG. 1 shows a self-coloring fishing lure according to the invention in the form of a fish egg. The lure is dome shaped with the round end towards the line attachment eye of a fishhook run centrally through the lure. The hook and barbed end of the fishhook protrudes out from a flat side of the lure. An extending portion of a fast colored core can be seen at the emersion point of the fishhook shank. The fast colored core is not visible through the lure material because the lure is illustrated dry in FIG. 1.
Figure 2:
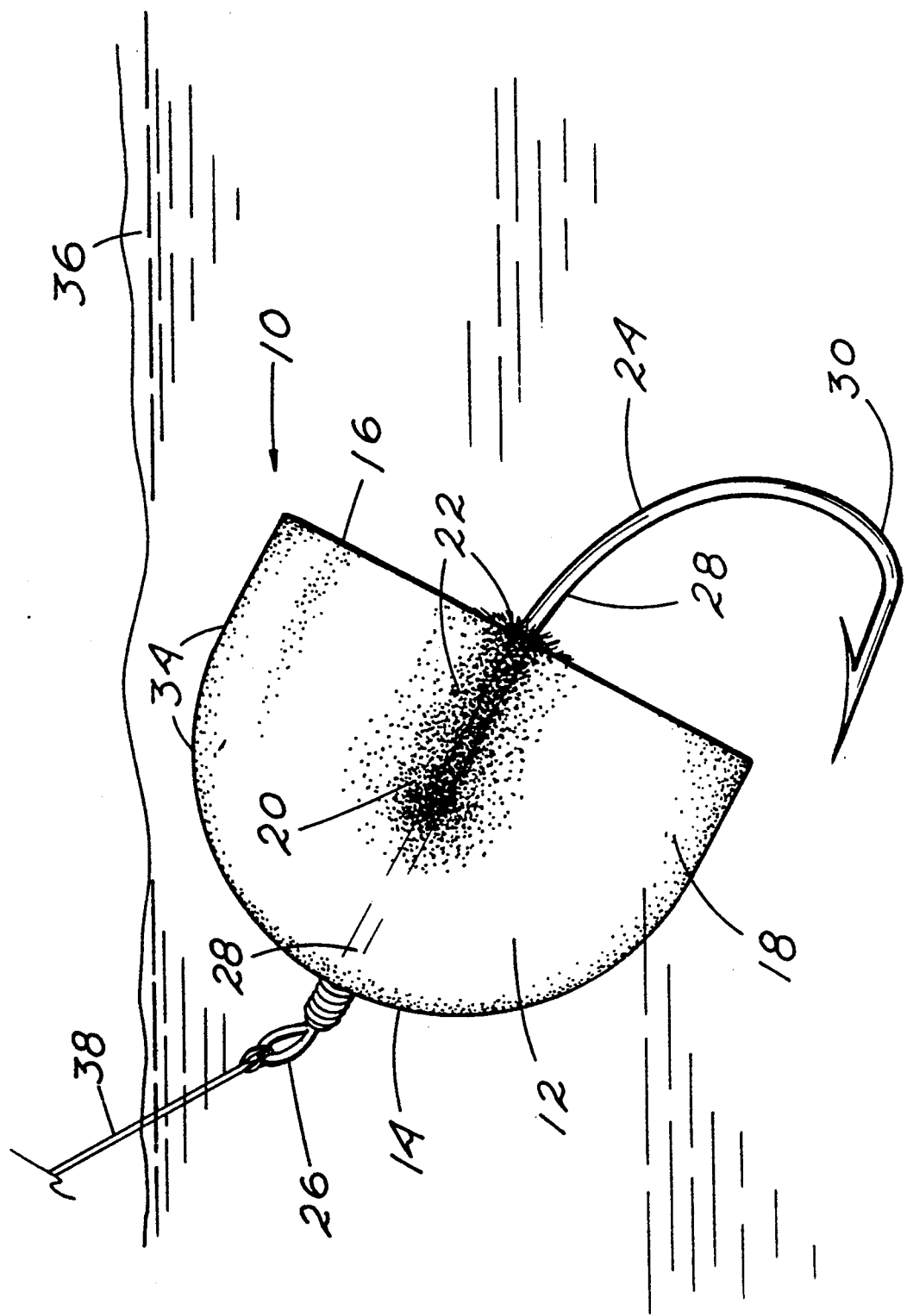
FIG. 2 shows the FIG. 1 fishing lure immersed in water illustrating the outer sponge-like open cell plastic cover material becoming translucent from water saturation and the fast colored core becoming discernible through the outer covering.

Referring now to the drawings at FIG. 1 and FIG. 2 which illustrate a characteristic employment of the invention in a self-coloring artificial fishing lure in the form of a fish egg. In this specification, the lure incorporating the present invention in varied fish attracting forms is designated lure 10. As shown in FIG. 1, lure 10 is configured in the form of a segmented fish egg 12. Fish egg 12 has a dome end 14 and a flat end 16 and is fabricated of a soft pliable permeable material, cover material 18. Cover material 18 encases a fast colored core material, core 20. A small segment, simulated vitellus 22, of core 20 protrudes centrally from flat end 16 of fish egg 12 around fishhook 24 which is affixed through the center of fish egg 12. Fishhook shank 28 of fishhook 24 passes through fish egg 12 with fishhook eye 26 at the peak of dome end 14 and fishhook spear end 30 just clear of flat end 16 with fishhook shank 28 protruding centrally from flat end 16. As a fish lure 10 attached by fishhook eye 26 to fishing line 38, fish egg 12 can be used without any coloring as the material of cover material 18 develops translucence when fish egg 12 is submerged in water 36, and fast colored core 20 becomes discernible creating the appearance of the transparent membrane of a real fish egg. See FIG. 2. For simulating other live baits or salmon eggs, the material of cover material 18 can be tinted with a light dye 32 to produce a desired effect.

Cover material 18 is fabricated from a soft pliable and resilient medium density expanded plastic 34 with polyurethane or polyether being preferred. These expanded plastic materials have open cellular cavities between pliable plastic material producing a spongy finish. Used in a predetermined thickness as a cover material 18 for a dark fast colored center, core 20, cover material 18 will hide core 20 when dry but will quickly become translucent and core 20 becomes discernible when cover material 18 on fish egg 12 is immersed in water 36. See illustration at FIG. 2.

In water 36, cover material 18, without dye 32, becomes lighter in color and translucent with core 20 becoming more and more visible as cover material 18 is being saturated. As this color changing occurs, fish egg 12 more and more resembles the transparent membrane of a real fish egg and core 12 resembles the vitellus 22.

Material used for core 20 can be string, feathers, or yarn 40 as illustrated in FIG. 1, 2, and 3. Core 20 can be applied by tying or by gluing over a variety of different sized conventional fishhooks 24 and then encased in covering material 18. For lures simulating crustaceans, small fish, or flies, the feathers or yarn 40 can extend out of the body section of lure 10 to simulate appendages 54 over and concealing the barb on spear end 30 of fishhook 24 and wave life-like in water 36. See FIG. 3.

As illustrated in FIG. 4, lure 10 can be fabricated in a variety of bait forms other than fish eggs 12 including minnows, nymphs, flies, and small crustaceans like crayfish 42 shown in FIG. 4. Outer cover material 18, the body material for crayfish 42, is applied over a fast color center core 20 which in turn is attached by tying or gluing to fishhook 24. Crayfish 42 has an elongated elliptical body crayfish body 44 which narrows at one end and is flattened out into a tail 46 somewhat paralleling the bend of spear end 30 of fishhook 24 where fishhook shank 28 emerges from crayfish body 44. Oppositely, at fishhook eye 26, crayfish body 44 is rounded into a head 48 and enhanced with eyes 50 and antenna 52. Fish egg 12 and crayfish 42 are indicative of a variety of small game fish bait forms to which the properties of lure 10 are applicable. With cover material 18 lightly dyed red by dye 32, crayfish 42 becomes a reddish outline with core 20 showing as internal organs when crayfish body 44 is immersed in water 36. Without core 20, the shimmering translucent outline produced when cover material 18 is immersed in water 38 becomes an effective fishing lure with cover material 18 shaped into a variety of bait forms. When no dye 32 is applied, the native structure of cover material 18 as used in the present invention changes from a solidly colored appearance dry to a shimmering translucent appearance wet which constitutes the self-coloring effect produced by the structural material and the composition of lure 10. These self-coloring and translucent features of the immediate invention makes any configurations of lures 10 into viable life-like game fish attracting baits.

Although we have described our invention with considerable details in the foregoing specification and illustrated the device in the drawings, we reserve the right to modify the invention so long as modifications made remain within the intended scope of the appended claims.

What we claim as our invention is:

1. A fishing lure having a lure body made by moldable structural materials and composition for self-coloring when wet, comprising, a fishhook having an eye at one end, and a shank extending from said eye to a pointed hook of said fishhook;

said lure body structured of a core material attached to said shank, said core material extending from adjacent said eye along said shank and terminating prior to reaching said pointed hook, said core material being a flexible fast colored material which retains its coloring when wet;

said lure body further structured of a covering material generally covering said core material, said covering material fabricated of soft pliable and resilient expanded open cell plastic, said covering material attached to said fishhook shank adjacent said eye, said covering material extending from adjacent said eye along said shank to generally cover said core material and then terminate prior to reaching said pointed hook, said covering material further being sufficiently thin-walled to become translucent upon submergence in water through expansion of said open cells absorbing the water, the translucence of the wet said covering material providing means allowing said core material to become visible through said covering material whereby the color of at least a portion of said lure body appears to change.

2. The fishing lure defined in claim 1 wherein said core material is made of yarn.

3. The fishing lure defined in claim 1 wherein said core material is made of feathers.

4. The fishing lure defined in claim 1 wherein said core material is made of string.

5. The fishing lure defined in claim 1 wherein said covering material is made of an open cell polyurethane expanded plastic foam.

6. The fishing lure defined in claim 1 wherein said covering material is made of an open cell polyether expanded plastic foam.

* * * * *